Feb. 6, 1968 — R. B. EMERY ET AL — 3,367,724
AERATING CARTRIDGE
Filed May 6, 1966 — 2 Sheets-Sheet 1
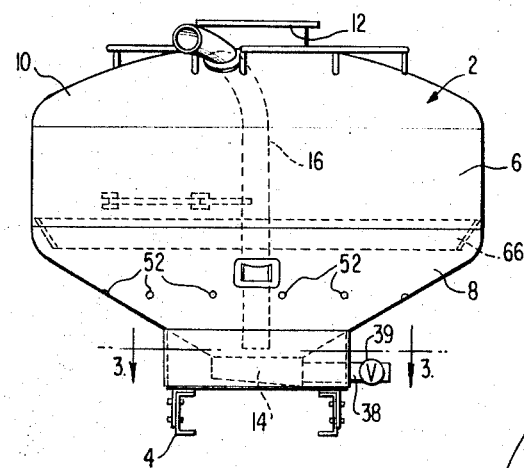
FIG 1
FIG 2
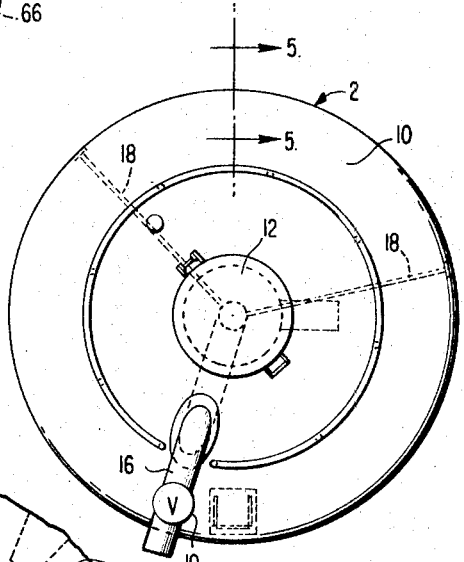
FIG 3
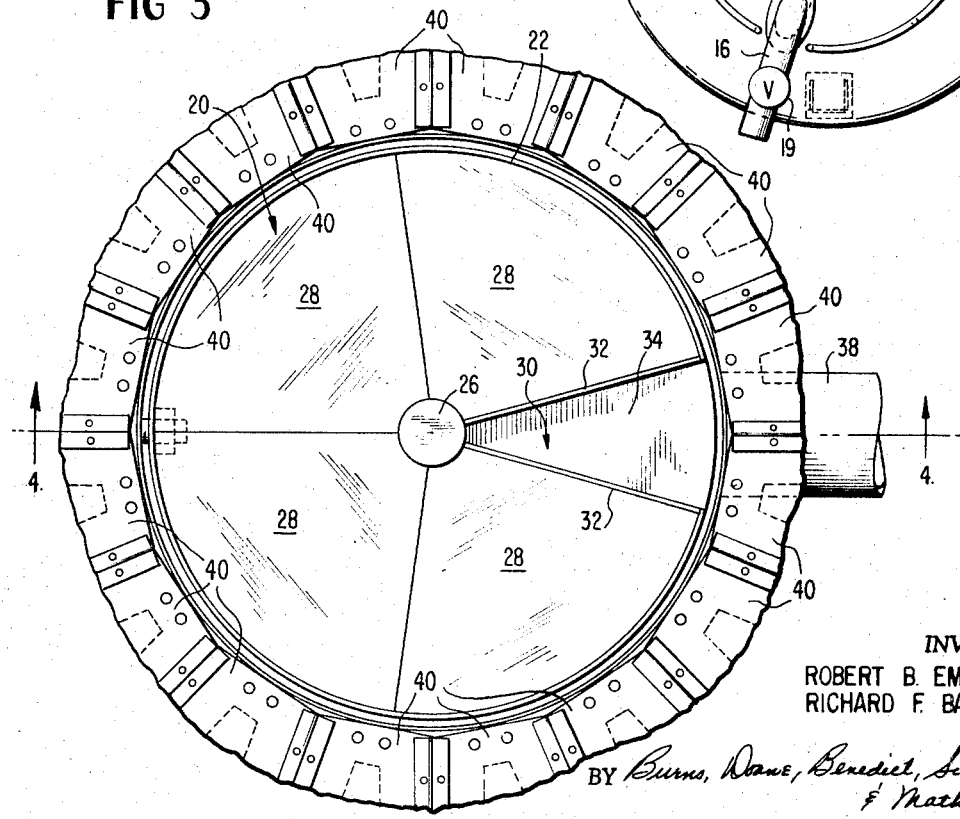
INVENTORS
ROBERT B. EMERY
RICHARD F. BAILEY
BY Burns, Doane, Benedict, Swecker, & Mathis
ATTORNEYS

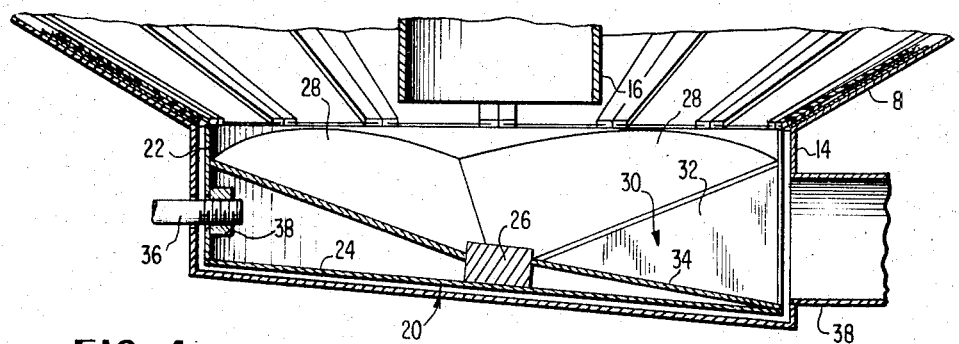
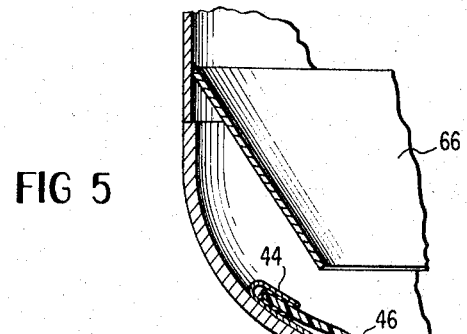
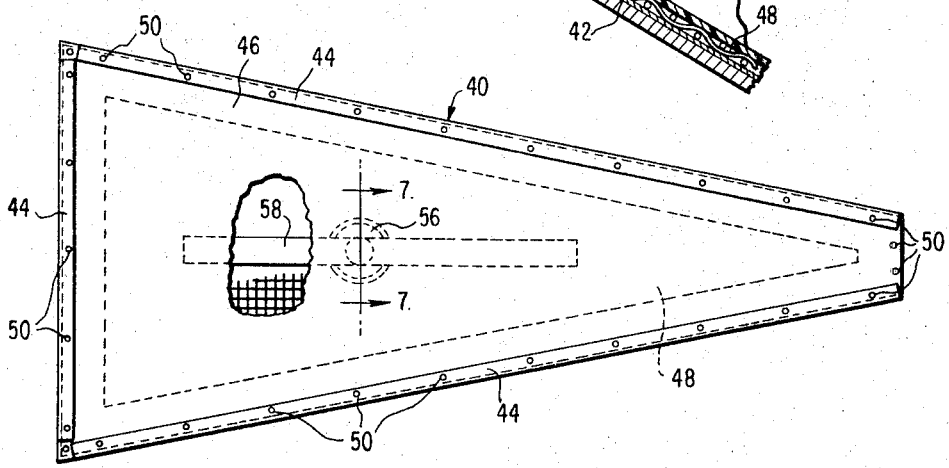
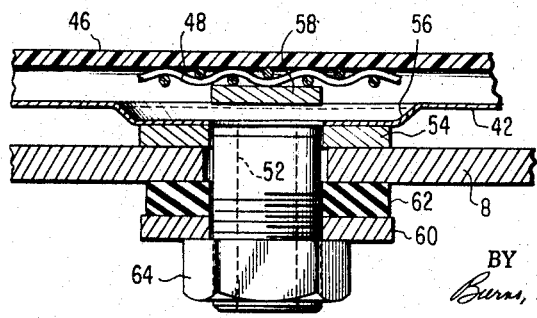

United States Patent Office 3,367,724
Patented Feb. 6, 1968

3,367,724
AERATING CARTRIDGE
Robert B. Emery and Richard F. Bailey, Duncan, Okla., assignors to Halliburton Company, Duncan, Okla., a corporation of Delaware
Filed May 6, 1966, Ser. No. 548,302
4 Claims. (Cl. 302—53)

ABSTRACT OF THE DISCLOSURE

A bulk storage tank including a system for discharging particulate material from the tank by fluidizing the material. The tank has sloping side walls and a well at the bottom of the tank. An upright discharge pipe is mounted in the interior of the tank and is centered over the well. Another discharge pipe extends outwardly through the side of the well and either of these two discharge pipes may be used for discharging from the top or the bottom of the tank. An aerating cartridge is positioned in the well to facilitate discharge of the material through either pipe. The cartridge has a plurality of porous, rigid surface elements and air or other aerating fluid is introduced into the interior of the cartridge for aerating particulate material above the porous surfaces, as the air flows upwardly through the surfaces. The cartridge includes a channel which extends from the center of the cartridge to the outer edge adjacent the wall of the well, and the channel is aligned with the entrance to the side discharge pipe. The porous surfaces slope toward the center of the cartridge, but the bottom surface of the channel slopes downwardly from the center of the cartridge toward the entrance to the side discharge pipe. The sloping porous surfaces are positioned sufficiently close to the vertical discharge pipe to be useful in aerating material when the side discharge conduit is closed, and material is being discharged through the vertical pipe. The channel is sufficiently narrow that it does not interfere with efficient discharge through the vertical pipe. However, when material is being discharged through the side discharge pipe, the channel cooperates with the sloping porous surfaces to direct fluidized material into the side discharge pipe.

---

This invention relates to apparatus for dispensing particulate material, and more particularly to apparatus for fluidizing particulate material in a storage tank.

A bulk storage tank containing particulate material may be emptied by introducing air into the mass of material at a sufficient velocity to fluidize the material adjacent an outlet pipe. The fluidized material enters the pipe and flows to a discharge point outside of the tank. An advantage of discharging particulate material from a tank in this manner is that the discharge pipe may be oriented vertically in the tank for discharging the fluidized stream through the top of the tank.

Typical bulk storage tanks are circular and have a conical, sloping side wall. Usually, the bottom of the tank is in the form of a cylindrical well over which the discharge pipe is suspended. In order to fluidize the material in the tank, aerating devices are positioned on the tank wall to direct the flow of air into the body of particulate material. Often, bridging occurs around the discharge pipe due to the weight of unaerated material which is wedged against the sloping wall. When bridging occurs, a cavity forms in the bulk material around the discharge pipe, resulting in incomplete or non-uniform discharge from the tank.

Accordingly, it is an object of this invention to provide apparatus for achieving efficient discharge of particulate material from a bulk storage tank.

It is a further object of this invention to provide apparatus which may be installed in conventional well bottom type, conical storage tanks for improving discharge of pulverulent material from the tank.

It is a still further object of this invention to provide apparatus for avoiding bridging and incomplete discharge from a conventional well bottom type conical wall bulk storage tank.

These objects are accomplished in accordance with a preferred embodiment of the invention by an aerating cartridge which is designed to fit in the cylindrical well in the tank bottom, directly under the vertical discharge pipe. The cartridge has a porous, rigid surface, and air is directed upwardly through the surface for fluidizing the pulverulent material adjacent to the lower end of the discharge pipe. Thus, bridging of the particulate material around the discharge pipe is eliminated. A secondary discharge conduit is provided in the side wall of the cylindrical well in the tank bottom and the cartridge cooperates with the side discharge conduit to permit selective discharge through the vertical pipe or through the side discharge conduit. The large aerating surface of the cartridge promotes thorough aeration of the particulate material and thus increases the discharge rate and promotes steady flow conditions. In the event of damage to the cartridge, it may be readily removed from the tank for repair or replacement.

This preferred embodiment is illustrated in the accompanying drawings in which:

FIG. 1 is a side elevational view of a conical side wall bulk storage tank having the cartridge of this invention incorporated therein;

FIG. 2 is a top plan view of the storage tank;

FIG. 3 is a cross sectional view of the tank along the line 3—3 in FIG. 1;

FIG. 4 is a cross sectional view of the tank along the line 4—4 in FIG. 3;

FIG. 5 is an enlarged detail view of the tank along the line 5—5 in FIG. 2;

FIG. 6 is a detail view of one of the aeration devices; and

FIG. 7 is a cross sectional view of the aeration device along the line 7—7 in FIG. 6.

A bulk storage tank 2 is shown in FIG. 1 as mounted on a frame 4 which may, for example, be a vehicle chassis. The tank 2 has a cylindrical side wall 6 and a conical side wall 8. The top 10 of the tank has a hatch for filling the tank with particulate material. A cylindrical well 14 is secured at the bottom of the tank to the lower edge of the conical side wall 8.

The tank 2 has an upright discharge pipe 16 suspended in the tank. A pair of braces 18 in the tank positions the discharge pipe 16 at approximately the central axis of the tank. The upper end of the discharge pipe 16 passes out of the tank through the top 10. A suitable valve 19 (FIG. 2) is provided for controlling the flow of particulate material through the discharge pipe 16.

The aeration cartridge 20 of this invention is inserted in the cylindrical well 14 at the bottom of the tank. The cartridge 20 has a cylindrical side 22 which is slightly smaller in diameter than the cylindrical well 14, so that the cartridge will fit snugly in the well. A circular bottom plate 24 is secured along its peripheral edge to the lower edge of the side 22. At the center of the plate 24, there is a block 26 which is secured to the plate 24. The block 26 supports a plurality of rigid, porous segments 28 in the aerating cartridge 20. The segments 28 are mounted between the side wall 22 and the block 26, and are secured in position by welding or other suitable means. Preferably, the segments 28 are formed of a permeable, rigid sheet material, such as sintered bronze having a permeability of about 12 to 14 cubic feet per minute, per square foot, at a pressure differential of 2 inches of water.

As shown in FIG. 4, the segments 28 are substantially flat and slope downwardly from the side 22 toward the center where they are secured to the block 26. A channel 30 is formed in the aerating cartridge 20 by a pair of upright radial plates 32. The outer edge of each plate 32 is secured to the side 22, as shown in FIG. 3, and the opposite end of each plate 32 is secured to the block 26 by welding or other suitable means. The side 22 terminates at each of the radial plates 32 and does not extend across the space between the plates.

The bottom of the channel 30 is formed by a segment 34 of rigid, porous sheet material similar to the segments 28. As shown in FIG. 4, the outer edge of the segment 34 is secured along the peripheral edge of the base plate 24 and the inner edge of the segment 34 is secured to the block 26. The space between the segments 28 and 34, and the bottom plate 24 forms a gas receiving chamber. Air is conducted into this chamber by a pipe 36 which passes through aligned openings in the side of the well 14 and the side 22 of the cartridge 20. The pipe 36 is threaded into a nut 38 which is secured over the hole in the side 22. Air that is conducted through the pipe 36 into the chamber passes upwardly through the gas permeable segments 28 and 34 to fluidize the particulate material above the cartridge. The radial plates 32 are preferably not permeable, so that substantially all of the air from the carticulate material around the inlet end of the pipe 16. Although the segment 34 is spaced further below the inlet end of the pipe 16 than the segments 28, it contributes to tridge is directed upwardly. A discharge conduit 38 is secured in an opening in the wall of the well 14. The discharge conduit 38 is in alignment with the channel 30, as shown in FIG. 3. A suitable valve 39 is provided in the conduit 38 to control the flow of fluidized material through the conduit.

The cartridge 20 may be operated for discharging pulverulent material in fluidized condition through either the discharge pipe 16 or the conduit 38. When air is supplied to the chamber in the cartridge through the pipe 36, at a sufficiently high rate to fluidize the material above the surface of the segments 28 and 34, the material may be discharged through the upright pipe 16 by opening the valve 19 controlling flow through the pipe 16 while maintaining the valve 39 in the conduit 38 closed. The segments 28 are in position for fluidizing the particulate material around the inlet end of the pipe 16. Although the segment 34 is spaced further below the inlet end of the pipe 16 than the segments 28, it contributes to fluidizing the particulate material above the cartridge. The slope of the segments 28 promotes the discharge of substantially all of the material in the tank. As the material is being discharged, the conical side wall 8 deflects the material toward the center of the tank and due to the wide area of aeration produced by the cartridge 20, there is substantially no bridging of the compacted material around the discharge pipe inlet.

In order to discharge the particulate material through the conduit 38, the valve 19 in the discharge pipe 16 is closed and the valve 39 controlling flow through the conduit 38 is opened. The particulate material directly above the segments 28 and 34 is fluidized by the air which passes upwardly through these segments and due to the pressure differential between the interior and exterior of the tank, a current of air draws the particulate material into the channel 30 from which it flows into the discharge conduit 38. Thus, the cartridge 20 facilitates discharge of the particulate material from the tank through either the upright discharge pipe 16 or the horizontal discharge pipe 38 at the tank bottom.

In order to promote additional fluidizing of the particulate material in the tank, and thereby avoid caking on the sloping conical side wall 8, additional aerating devices 40 may be mounted on the interior of the sloping side wall 8, as shown in FIGS. 5 to 7. The aerating devices 40 are arranged to fit together in such a way that they cover substantially the entire sloping surface of the side wall 8. Each device 40 has a sheet metal back 42 with the marginal edges folded in overlapping relation to form flanges 44. The back 42 is generally triangular in shape, so that the adjacent devices 40 fit together around the sloping side wall 8, as shown in FIG. 3. A flexible, permeable, sheet material 46 is received in the space between the flanges 44 and the back 42, as shown in FIG. 5, and is secured by a plurality of rivets 50 which are spaced along the flanges 44. Cement may also be applied to the edges of the sheet material 46 before the edges are inserted under the flanges 44. Preferably, the sheet material 46 is formed of a flexible plastic sheet which has a permeability of about 9 to 11 cubic feet of air per minute per square foot, at a pressure differential of 2 inches of water.

A wire screen 48 is positioned in the device 40, between the sheet material 46 and the back 42. The edges of the screen 48 conform to the shape of the back 42 and are spaced from the flanges 44. The screen facilitates diffusion of air from the center of the device outwardly toward the edges in order to provide substantially uniform air flow upwardly through the sheet material.

Air is introduced to the interior of the device 40 through a tubular fitting 52 which is secured to the back 42. A washer 54 is welded or otherwise secured around a hole in the back 42 and reinforces the mounting for the fitting 52. A circular depression 56 is formed in the back around the outlet end of the fitting 52 and a bar 58 extends longitudinally of the back 42 between the back and the screen 48. The depression 56 and the bar 58 provide a relatively large flow passage for the air as it is distributed throughout the device 40 from the fitting 52.

The aerating devices 40 are secured in the side wall 8 in abutting relation with adjacent devices 40 and are clamped against the side wall by washers 60 and 62, as shown in FIG. 7. A nut 64 on the tubular fitting 52 cooperates with the washers 60 and 62 to clamp the washer 54 tightly against the side wall 8 of the tank. Thus, the fitting 52 of each device 40 secures the device in the tank.

At the intersection of the cylindrical side wall 6 and the sloping side wall 8, there is a skirt 66 (FIG. 5) which projects inwardly from the side wall 6. The skirt 66 overhangs the outer flange 44 of each of the devices 40 which are arranged around the circumference of the tank. The skirt 66 diverts the particulate material away from the outer end of the devices 40 to avoid caking or bridging of the material in the corner formed between the vertical side wall 6 and the sloping side wall 8.

In operation, particulate material may be emptied from the tank readily by supplying air to each of the devices 40 through the fittings 52. The air flows upwardly through the porous sheet material 46 to fluidize the particulate material above the sloping side wall 8. Air is also directed into the aeration cartridge 20 adjacent the lower end of the discharge pipe 16 for aerating particulate material at the bottom of the tank. By opening one of the valves 19 and 39, the contents of the tank may be discharged selectively through either the upright discharge pipe 16 or the horizontal discharge pipe 38. The combination of individual aeration devices 40 and the aeration cartridge 20 in the well at the bottom of the tank provides substantially complete clean out of the contents of the tank without bridging or caking.

A particular advantage of the aerating cartridge 20 is that it can be readily removed as a unit from the tank for repair or replacement. The cartridge also achieves the advantage of fluidizing particulate material over substantially the entire surface area of the well at the bottom of the tank, while providing a horizontal discharge at the bottom of the tank.

While this invention is illustrated and described in one embodiment, it is recognized that variations and changes

We claim:
1. In a storage tank of the type having a sloping side wall and a cylindrical well at the bottom of the tank, said well including an upright wall and a bottom plate, said tank including sealing means to permit internal pressurization of the tank and including an upright discharge pipe suspended in the tank above said well with the pipe inlet opening centered over said well, aeration apparatus for fluidizing particulate material in the tank comprising:
 (a) an aerating cartridge in said well,
 (b) said cartridge having a substantially circular base plate and an upright side extending around a major portion of the peripheral edge of said base plate, said side having opposed, axially extending edges, said cartridge base plate being superimposed on said well bottom plate,
 (c) said cartridge having a pair of upright radial plates secured on said base plate, each radial plate extending from adjacent the center of said base to one of said side edges and being joined along said one side edge, said radial plates being spaced apart and defining a channel therebetween, said base plate and cartridge side and radial plates being substantially impermeable,
 (d) said cartridge having rigid gas permeable first surfaces extending in downwardly sloping relation from said cartridge side toward the center of said base plate and a gas permeable second surface in said channel extending between said radial plates, said surfaces cooperating with said cartridge side and said radial plates and said base plate to form a fluid chamber, means for introducing gas into said chamber, and
 (e) a discharge conduit communicating with the interior of said well through an opening in said well wall, said conduit having an inlet opening aligned with said channel, whereby particulate material in said tank may be fluidized and discharged selectively through either said upright discharge pipe or said discharge conduit.

2. In a storage tank according to claim 1, wherein said first surfaces are formed of a plurality of substantially flat segments, said second surface extending in downwardly sloping relation from adjacent the center of said base plate to the peripheral edge thereof.

3. An aerating cartridge for fluidizing particulate material in a storage tank, said cartridge comprising:
 (a) a substantially circular base plate and an upright side extending around a major portion of the peripheral edge of said base plate, said side having opposed, axially extending edges,
 (b) a pair of radial plates secured on said base plate, and each radial plate extending from adjacent the center of said base to one of said side edges and being joined along said one side edge, said radial plates being spaced apart and defining a channel therebetween, said base plate, side and radial plates being substantially impermeable,
 (c) rigid surfaces extending in downwardly sloping relation from said side to adjacent the center of said base plate, said surfaces being gas permeable, said surfaces cooperating with said side and said radial plates and said base plates to form a fluid chamber,
 (d) means for admitting gas into said chamber, whereby said cartridge may be inserted in a tank to fluidize particulate material in the tank and discharge the material from the tank.

4. The cartridge according to claim 3 including a rigid segment in said channel, said segment extending in downwardly sloping relation from adjacent the center of said base plate to the peripheral edge thereof and defining a second fluid chamber between said base plate and said segment, said segment being gas permeable, and means for conducting gas into said second chamber.

References Cited

UNITED STATES PATENTS

| | | | |
|---|---|---|---|
| 2,924,489 | 2/1960 | Beckmann | 302—52 |
| 2,968,425 | 1/1961 | Paton | 222—195 |
| 3,179,378 | 4/1965 | Zenz et al. | 302—53 X |
| 3,194,443 | 7/1965 | Gurney | 222—193 |
| 3,236,422 | 2/1966 | Bailey et al. | 302—53 X |
| 3,260,389 | 7/1966 | Paton | 302—53 X |

FOREIGN PATENTS 702,328  1/1965  Canada.

ROBERT B. REEVES, *Primary Examiner.*

N. L. STACK, *Assistant Examiner.*